US005791033A

United States Patent [19]

Norby et al.

[11] Patent Number: 5,791,033

[45] Date of Patent: Aug. 11, 1998

[54] RAILROAD CAR TRUCK SPRING JACK

[75] Inventors: Robert V. Norby, Munster, Ind.; Henry F. Ninstil, Overland Park, Kans.; Stefan Pendrick, Hammond, Ind.

[73] Assignee: Holland Company, Chicago Heights, Ill.

[21] Appl. No.: 754,196

[22] Filed: Nov. 27, 1996

Related U.S. Application Data

[60] Provisional application No. 60/007,865 Dec. 1, 1995 and provisional application No. 60/018,613 Jun. 3, 1996.

[51] Int. Cl.[6] .................... B23P 19/04

[52] U.S. Cl. .................... 29/227; 29/225; 29/238; 29/252; 254/93 R; 254/10.5

[58] Field of Search .................... 29/227, 225, 238, 29/252, 257, 266; 254/93 R, 10.5, 89 H, 133 R; 269/111

[56] References Cited

U.S. PATENT DOCUMENTS

| | | | |
|---|---|---|---|
| 2,540,388 | 2/1951 | Dreeben | 29/225 |
| 3,281,108 | 10/1966 | Lewis et al. | 248/354 |
| 3,329,404 | 7/1967 | Castoe | 254/93 |
| 3,662,994 | 5/1972 | Johns | 29/238 |
| 3,935,630 | 2/1976 | Roy | 29/227 |
| 4,045,855 | 9/1977 | Kruk et al. | 29/252 |
| 4,240,191 | 12/1980 | Schroyer | 29/252 |
| 4,520,543 | 6/1985 | Ito | 29/227 |
| 4,572,481 | 2/1986 | Chambers | 254/106 |
| 4,641,814 | 2/1987 | Lala et al. | 29/227 |
| 4,732,365 | 3/1988 | Kloster | 29/227 |
| 4,736,505 | 4/1988 | Vanbeber | 29/227 |
| 4,886,244 | 12/1989 | Renault | 254/932 P |
| 5,477,598 | 12/1995 | Borner, Jr. | 254/10.5 |
| 5,507,470 | 4/1996 | Amstutz | 29/227 |

*Primary Examiner*—James G. Smith
*Assistant Examiner*—Lee Wilson
*Attorney, Agent, or Firm*—Lee, Mann, Smith, McWilliams, Sweeney & Ohlson

[57] ABSTRACT

A railroad car truck frame jack clamps a side frame, the clamps suspend a cross tube which in turn suspends one or more cylinders which raise a bolster plug thereby lifting the bolster relative to the side frame and decompressing the truck springs for repair or replacement, twisting loads being minimized in the preferred embodiment by a lost motion slot.

13 Claims, 4 Drawing Sheets

RAILROAD CAR TRUCK SPRING JACK

DESCRIPTION OF RELATED APPLICATIONS

This application claims priority based upon application Ser. No. 60/007,865 filed on Dec. 1, 1995 and application Ser. No. 60/018,613 filed on Jun. 3, 1996.

BACKGROUND OF THE INVENTION

1. Field of the Invention

The invention relates to a jack apparatus for jacking the bolster of a railroad car truck from the truck side frames to enable repair or replacement of truck springs.

2. Description of Related Art

Railroad car trucks include side frames connected to the wheels, the side frames being interconnected by a transom. The side frames support a plurality of springs on either side and the springs support a bolster which is a beam that extends from one side to the other—from one set of springs to the other—and the center of the bolster supports the railroad car. Thus, the weight of the car is borne by the two sets of springs, one set associated with each side frame. In the current state of the art, when a railcar truck spring or springs needs to be replaced, jacks are placed underneath the car pushing against the road bed and essentially the entire car end is lifted to decompress the springs. This is a difficult operation in the field given the condition of roadbeds and the equipment needed to jack up one end of an entire railroad car.

Another current practice utilizes an ordinary jack placed between the road bed and bolster. The jack can be placed at an angled, rather than vertical, position thereby creating an unstable condition with potential for jack slippage either at the roadbed or at the bolster.

SUMMARY OF THE INVENTION

The invention is a hydraulically operated jacking device designed to allow the servicing of broken freight car truck springs. This portable device is designed to service unloaded freight cars equipped with at least several different truck sizes and types. The proportions and dimensions of the truck jack disclosed herein are particularly designed with common 70 and 100 ton ASF and Buckeye trucks, however through appropriate use of shims or adjustments clamps on most 70 and 100 ton trucks. With modification to the proportions of the elements shown, consistent with the principles disclosed herein, the invention taught here can accommodate most other trucks. The invention is not, therefore, limited to specific brands or sizes of trucks.

The truck jack allows service to broken springs from the field side of the rail car and is fully supported from the truck side frame. The rail, ballast or ties are not used at any time during the jacking operation, thus allowing more stable operation on track or in the shop without compromising the integrity of the road bed.

It is expected that a truck jack made using materials known to one in the art in accordance with the teachings here can have a 30,000 lb. or greater capacity. Using the seven individual pieces taught can be expected to yield a maximum individual piece weight of less than 50 lbs. The total assembly's weight is about 180 lbs. The installation time for the truck jack may be expected to be under five minutes.

An important feature of the truck jack is that it is supported from side frame and not the ties, rail or ballast.

Unique in the truck jack is the clamp mechanism that lifts from the top of side frame, while reducing or eliminating twisting loads between the clamp and sideframe. In the preferred embodiment, a pivoting load bar in conjunction with a hanger assembly maintains jack alignment during lifting.

Another advantage in the truck jack is that it provides a clear working area for spring removal. The truck jack also allows change-out on the track or anywhere in a car shop, without being limited by the condition of rails, ties, ballast or other working surface.

It is expected that with the truck jack of the invention, spring change-outs can be performed in less time than AAR standards.

The hydraulic cylinder can be powered by a manual pump, a power take-off from a service truck or a portable power unit.

These are accomplished by using a railroad car truck frame jack having a plurality of clamps which clamp a side frame of a railroad car truck. The clamps suspend a cross tube which in turn suspends a hydraulic cylinder, in the preferred embodiment. Two or more cylinders can be used in alternative embodiments.

In the alternative embodiment the cross tube suspended cylinder(s) have a lifting bar fitted thereto. The lifting bar is needed in the alternative embodiment to span the distance between the cylinders.

A bolster plug engages the truck bolster. The bolster plug engages either the cylinder assembly directly (in the preferred embodiment) or the lifting bar (in the alternative embodiment) so that actuating the cylinder raises the bolster plug thereby lifting the bolster relative to the side frame and decompressing the truck springs for repair or replacement.

BRIEF DESCRIPTION OF DRAWINGS

FIG. 6 B is a front elevational view of an alternative embodiment of the apparatus with an adjustable shim on the jaw.

DESCRIPTION OF PREFERRED EMBODIMENT

Figure 4:
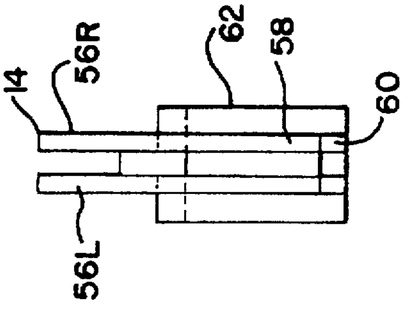
FIG. 4 is a front elevational view of the preferred embodiment of the C-frame on a railroad car truck looking outwardly from the car centerline.

The invention is a railroad car truck jack 10 generally includes a pair of clamps 12 that fit over the top of the side frame. Each clamp 12 is formed in two pieces pivoted relative to one another, one clamp member 14 is generally an inverted U-shape, but one of the legs on the "U" is truncated, making the member 14 asymmetric. The other clamp member 16 is pivoted to member 14 at pin 18.

Pin 18 is slidably and pivotably carried in journal slots 20. Member 16 has downwardly depending portion 22, which is opposed to clamping portion 24 of the U-shaped member 14. Portion 22 has a cantilevered hook 26 extending outwardly therefrom. The cantilevered hook 26 forms a saddle 28 in which a crosstube (or rod) 30 rests.

The clamps are used in pairs, each pair being mounted above and slightly longitudinally offset from the location of the springs 32 in the side frame 34. In the alternative embodiment cross tube 30 has a plurality of terminal flanges 36 which assisting in lining up the clamps 12 in the desired position.

Suspended from the crosstube 30 is a hanger assembly 38. Hanger assembly 38 supports hydraulic cylinder or jack 40. While a hydraulic cylinder is preferred for performing the jacking function, alternatives such as a screw mechanism, pneumatic cylinders, or other mechanical options could perform this function. The cylinder hangs downwardly and lines up at about the same height as the springs are located.

Figure 1:
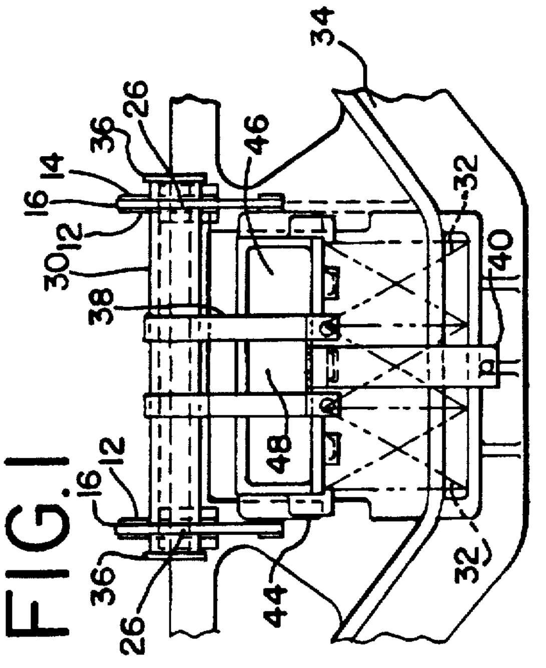
FIG. 1 is a front elevational view of the preferred embodiment of the apparatus on a railroad car truck.

Truck bolsters 44 are formed to have apertures 46 (shown in FIG. 1) which are open to the exterior portion of the truck. Bolster plugs 48 are placed in those apertures 46 and extend outwardly and are engaged by the assembly 38. Since these bolster plugs 48 fit into the bolster 44, as the cylinder 40 is pressurized and exerts an upward force, the cylinder and bolster plug 48 assembly in turn lifts the bolster 44 to a distance sufficient to decompress the springs 32 thereby lifting the railroad car. The load is thus borne ultimately by the side frames 34 and wheels (not shown) without engaging the roadbed, track, ties or the like. The wheels remain in contact with the rails providing a greatly controlled lift minimizing the difficulties present in the prior art practice of jacking the entire car from the roadbed.

Figure 3:
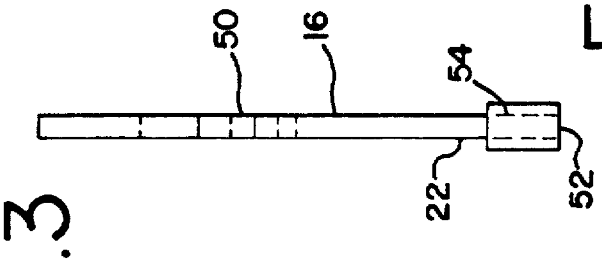
FIG. 3 is a front elevational view of the preferred embodiment of a front hook of the apparatus on a railroad car truck.

As shown in FIG. 3, the portion 22 has pin receiving aperture 50 formed to receive pin 18. Downwardly depending portion 22 at its end 52 has jaw 54 to engage side frame 34.

Figure 6A:
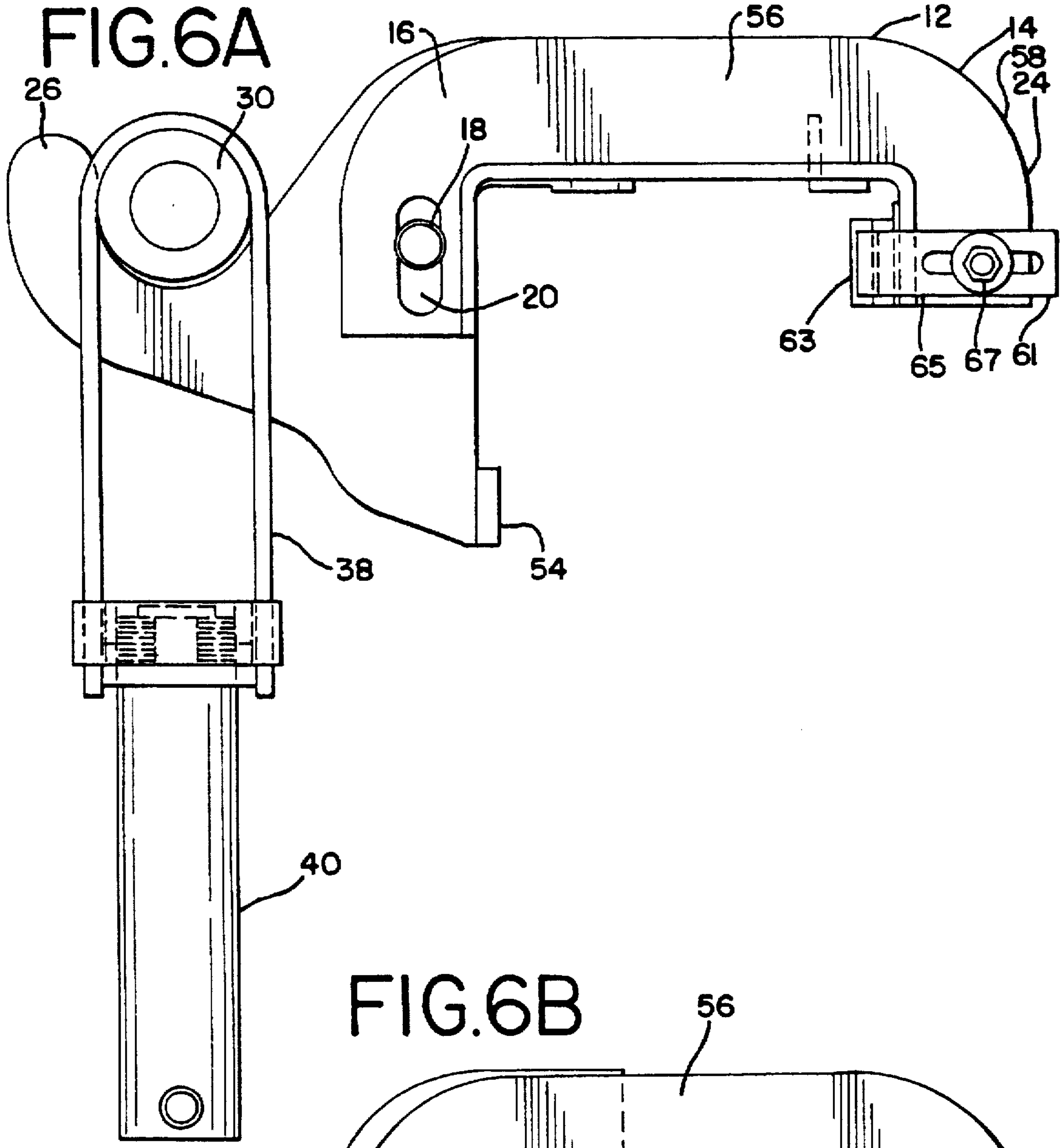
FIG. 6 A is a front elevational view of the preferred embodiment of the apparatus with an adjustable shim on the arm.
Figure 6B:
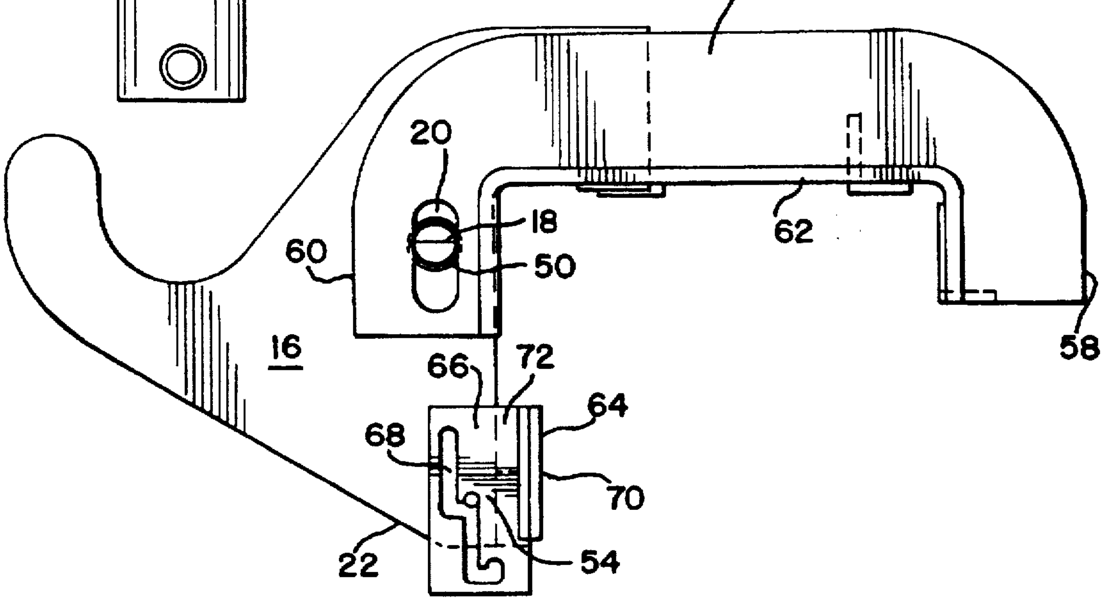
Figure 7:
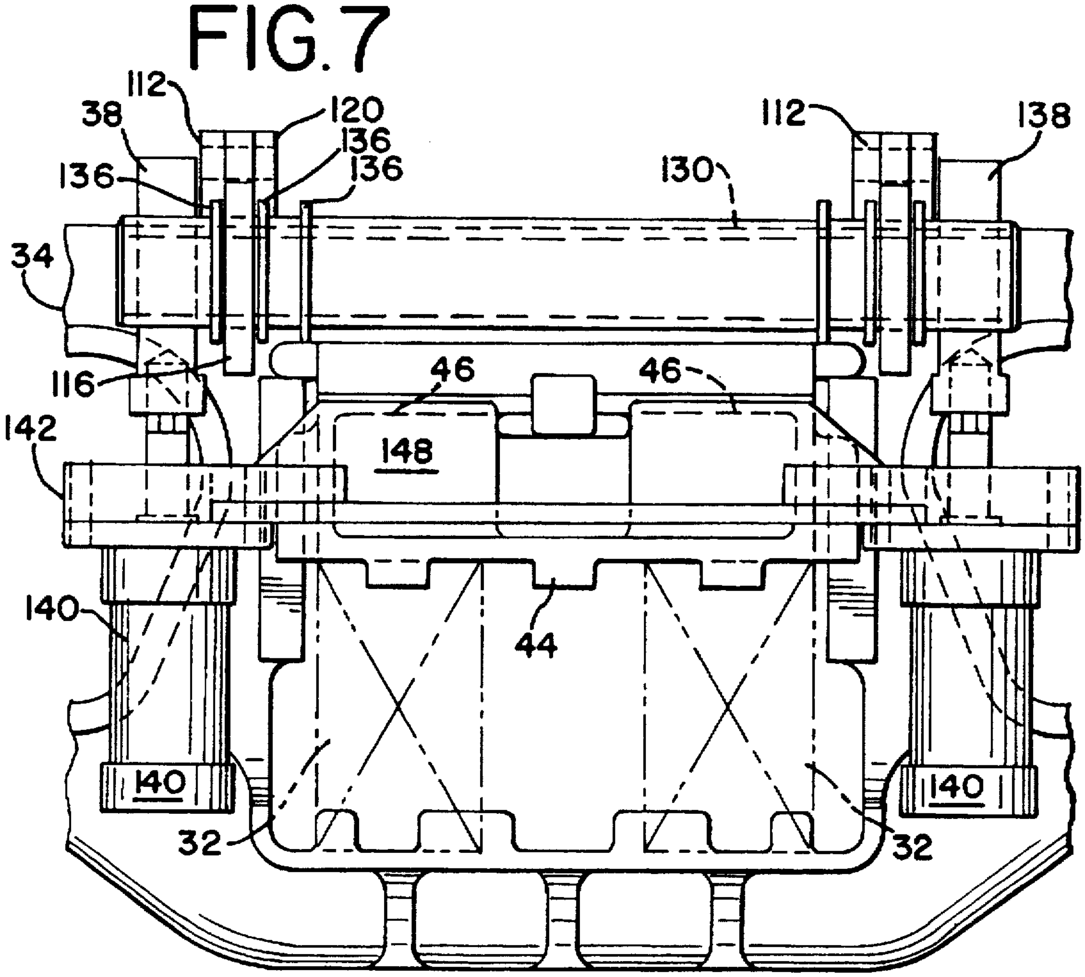
FIG. 7 is a front elevational view of an alternative embodiment of the apparatus on a railroad car truck.
Figure 8:
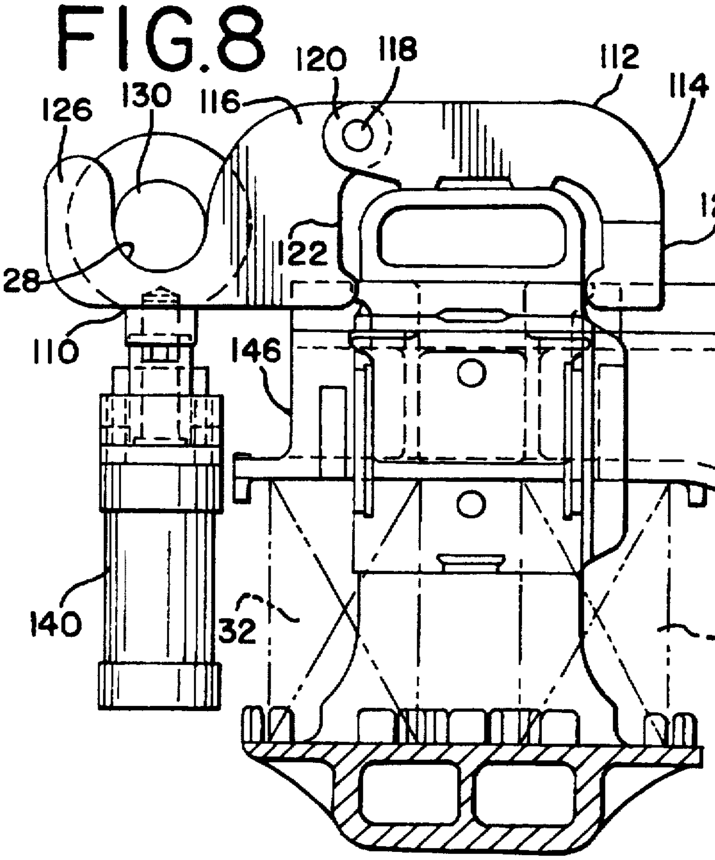
FIG. 8 is a side elevational view of an alternative embodiment of the apparatus on a railroad car truck.
Figure 9:
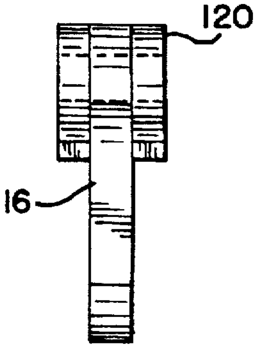
FIG. 9 is a front elevational view of an alternative embodiment of a clamp of the apparatus on a railroad car truck.
Figure 10:
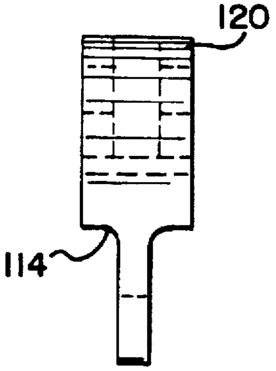
FIG. 10 is a front elevational view of an alternative embodiment of the apparatus on a railroad car truck looking outwardly from the car centerline.
Figure 11:
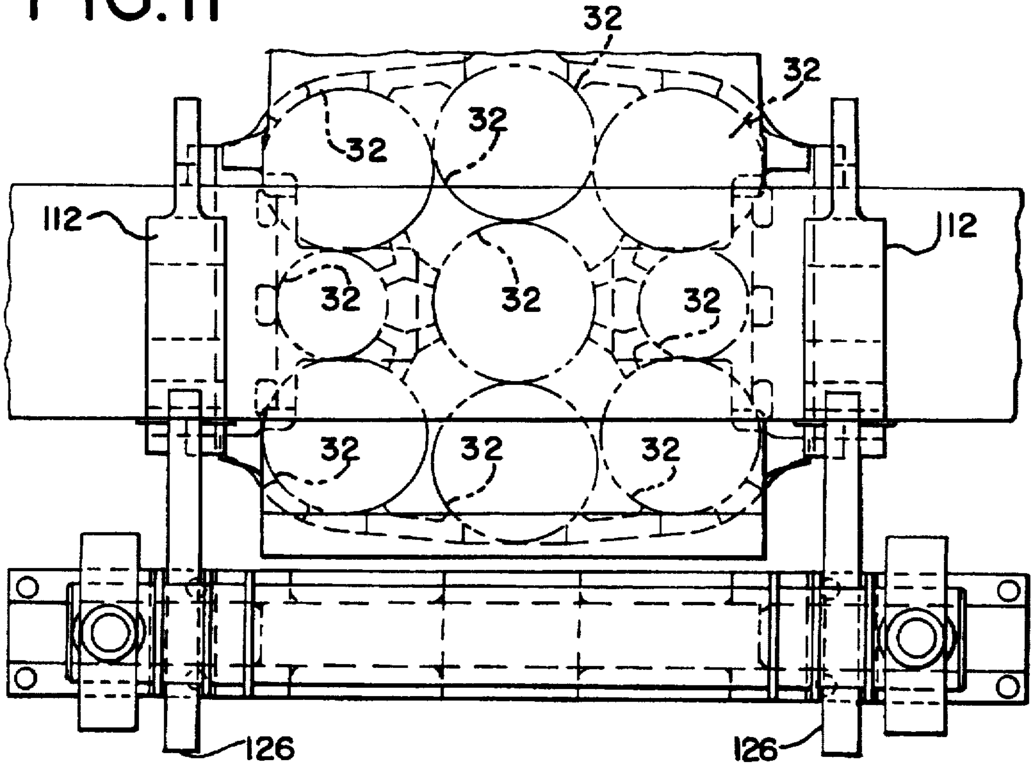
FIG. 11 is a top plan view of the apparatus of an alternative embodiment of the apparatus on a railroad car truck.

As shown in FIG. 4 and FIG. 6, clamp member 14 is formed of a plurality of parallel plates 56 L and 56 R. As shown in FIG. 7 each plate 56 L, 56 R has an inner downwardly depending arm 58—which fits inboard the rail car side frame—and an outer downwardly depending arm 60. Outer arm 60 is formed to have slots 20 which receive pin 18. Flange 62 joins the two plates 56 L and 56 R and bears directly on the top of the side frame.

Figure 2:
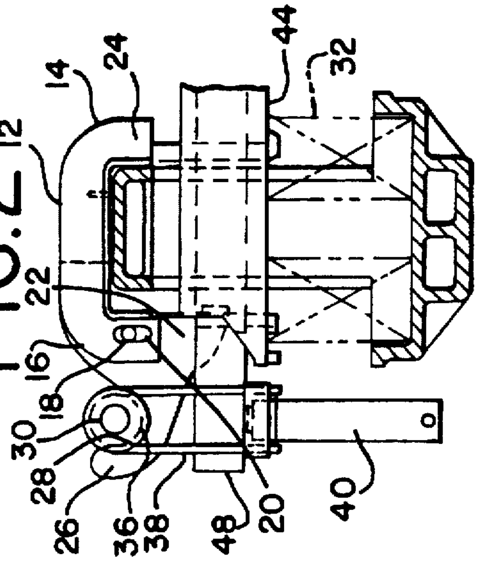
FIG. 2 is a side elevational view of the preferred embodiment of the apparatus on a railroad car truck.
Figure 5:
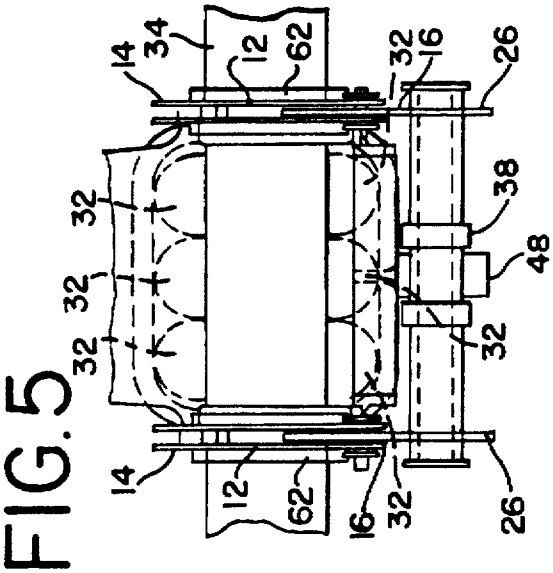
FIG. 5 is a top plan view of the apparatus of the preferred embodiment of the apparatus on a railroad car truck.

FIG. 6 A shows a preferred shim 61 which is movably mounted to arm 58. Shim 61 includes pad 63 on slotted blade 65. Pad 63 can be doubled or shim members removed, as the case may be, to customize the span between pad 63 and jaw 54. The position of blade 65 can be locked by fastener 67 which may be a bolt and nut, or other suitable fastener. This shim is preferred because it maintains jaw 54 in close contact with the side frame, the side frame being shown in FIG. 2.

FIG. 6 B shows an alternative shim 64. Shim 64 has side plate 66 which is formed to have a zig-zag shaped positioning slot 68 generally formed as two interconnected L-shaped slots. Bearing surface 70 is adapted to bear directly on truck side frame 34 on one side and jaw 54 on the opposite side. Slot 68 permits shim 64 to be positioned in three selected positions where in a first position bearing surface 70 is in the same vertical plane as jaw 54 for maximum clearance between jaw 54 and that portion of flange 62 on arm 58. By stepping surface 70 at upper portion 72 it can define a second position and a third position, both of which put bearing surface 70 in compression when member 16 is under load.

A key to the effectiveness of the preferred embodiment is the clamping action in conjunction with pin 18 and slots 20. Because arm 26 is highly loaded with the weight of the car, but is located some distance from side frame 34 a moment may be created and there would normally be a tendency to twist clamp 12 in addition to the clamping load between jaw 54 and arm 58. This is particularly so because of the tolerances involved. There is often variation in the thickness of side frames, the shape of the surfaces and their condition.

The use of slots 20 permit vertical movement between members 14 and 16. This creates a much more effective clamping load across jaw 54 and arm 58 because they will reach an equilibrium and twisting movement will be dissipated by the lost motion effect of the movement of pin 18 in slots 20. Thus, the clamp 12 provides a firm anchor point for applying the load.

In light of these observations, the preferred embodiment clamp could be used for purpose other than truck spring jacking. For example, in lieu of hanging a cylinder, a platform supporting an ordinary screw or hydraulic jack could be placed in a position such as arm 26 and the car body jacked off the truck using an ordinary hydraulic jack using a pair of clamps on each side of the truck such as for the replacement of bolster bearings or bowls. Thus, the lost motion slotted clamp has other uses than those disclosed for the car truck spring jack.

DESCRIPTION OF AN ALTERNATIVE EMBODIMENT

An alternative design for a railroad car truck jack 110 generally includes a pair of clamps 112 that fit over the top of the side frame. Each clamp 112 is formed in two pieces pivoted relative to one another, one clamp member 114 is an inverted L-shape, the other clamp member 116 is pivoted thereto at pin 118 in journal 120 and has a downwardly depending portion 122, a mirror image of the opposite portion 124 of the L-shape member 114 and has a cantilevered hook 126 extending outwardly therefrom. The cantilevered hook 126 forms a saddle 128 in which a crosstube (or rod) 130 rests.

The clamps are used in pairs, each pair being mounted above and slightly longitudinally offset from the location of the springs 32 in the side frame 34. The crosstube 130, in this alternative embodiment, has a plurality of locating rings or flanges 136 which line up the clamps 112 in the desired position depending on the particular configuration of the truck side frame 34—some are longer than others and with varying tapered and flat surfaces available for clamping, as described above.

Suspended from the crosstube 130 is a pair of eyes 138, one associated with each clamp 112 which in turn support a pair of hydraulic cylinders 140. The cylinders hang downwardly and line up at about the same height as the springs 32.

Next, a lifting bar 142 is placed spanning the distance between the cylinders. The lifting bar 142 generally runs parallel to the crosstube 130. Truck bolsters 44 are formed to have apertures 46 which are open to the exterior portion of the truck. Bolster plug 148 is placed in those apertures 46 and extend outwardly and is engaged by the lifting bar 142. Since this bolster plugs 148 fits into the bolster 44, as the cylinders 140 are pressurized and exert an upward force, the lifting bar 142 and bolster plug 148 assembly in turn lifts the bolster 44 to a distance sufficient to decompress the springs 32 thereby lifting the railroad car. Taken together, lifting bar 142 in conjunction with eyes 138 comprises a hanger assembly in this alternative embodiment. The load is thus borne ultimately by the side frames 34 and wheels (not shown) without engaging the roadbed, track, ties or the like. The wheels remain in contact with the rails providing a greatly controlled lift minimizing the difficulties present in the prior art practice of jacking the entire car from the roadbed.

As many and varied modifications of the subject matter of this invention will become apparent to those skilled in the art from the detailed description given hereinabove, it will be understood that the present invention is limited only as provided in the claims appended hereto.

In accordance with the invention, we claim:

1. A jack device for servicing of rail car truck springs on car trucks having a side frame and a bolster comprising:

a clamp for lifting the bolster, having a first gripping member and a second gripping member for capturing said side frame therebetween;

a supporting member extending from said clamp;

a bolster plug engaging the bolster;

a lifting jack operably connected to said bolster plug;

a hanging assembly operably connecting said support member to said jack, whereby said jack is adapted to lift said bolster plug, and in turn the bolster, said clamp remaining substantially torsionless with reference to said side frame;

said clamp having a first clamp member and a second clamp member pivotally connected to said first clamp member;

said first gripping member being formed on a downwardly depending portion of said first clamp member;

said second gripping member being formed on a downwardly depending portion of said second clamp member;

said supporting member being a hook projecting outwardly from said second clamp member;

whereby a load borne by said supporting member urges said first gripping member and said second gripping member together through the action of said pivot.

2. The jack device according to claim 1 wherein said first clamp member being formed as a plurality of parallel substantially inverted U-shaped flanges joined by a substantially inverted U-shaped web so that a first downwardly depending first gripping member is formed;

opposite said first gripping member a second downwardly depending portion is formed to have a plurality of slots adapted to receive a pivot pin;

a pivot pin being fitted to said second downwardly depending portion whereby a pivoting connection is provided with said second clamp member.

3. The jack device according to claim 1 wherein said second clamp member being formed as a substantially L-shaped member with a downwardly depending portion on which said second gripping member is formed;

said supporting member projecting from said third downwardly depending portion;

said downwardly depending portion being formed to receive a pivot pin;

said pivot pin being fitted to said downwardly depending portion whereby a pivoting connection is provided with said first clamp member.

4. The jack device according to claim 1 wherein said first clamp member being formed as a plurality of parallel substantially inverted U-shaped flanges joined by a substantially inverted U-shaped web so that a downwardly depending second gripping member is formed;

opposite said second gripping member a downwardly depending portion is formed said flanges and said web to have a plurality of slots adapted to receive a pivot pin;

said second clamp member being formed as a substantially L-shaped member with a second downwardly depending portion on which said second gripping member is formed;

said load bar supporting member projecting from said downwardly depending portion;

said first and said second downwardly depending portions being formed to receive a pivot pin;

said pivot pin being fitted to said downwardly depending portion whereby a pivoting connection is provided between said clamp members;

whereby the fitting of said pin in said slot operates as a lost motion mechanism so that twisting moment applied between the load supporting member and the frame is substantially absorbed.

5. The jack device according to claim 1 wherein a pair of said clamps being provided with said a load bar spanning the distance therebetween and a single jack being provided on said load bar for lifting said car.

6. The jack device according to claim 1 wherein a pair of said clamps being provided with a load bar spanning the distance therebetween and a pair of jacks being provided on said load bar for lifting said car; said jacks being positioned at preset locations along said load bar.

7. The jack device according to claim 1 wherein said second gripping member being fitted with an adjustable shim so that the dimension between said shim and said first gripping member can be adjusted to substantially conform to the width of the side frame.

8. A clamp for supporting a load on a frame, comprising:

a clamp having a first clamping member and a second clamping member for capturing said frame therebetween;

said first member including a U-shaped area for receiving said frame and said second member being L-shaped and including a bearing surface for abutting said frame;

a pivot pin for pivotably joining said members whereby under load said members pivot with respect to one another thereby torsionlessly gripping said frame;

said first member having a plurality of parallel substantially inverted U-shaped flanges joined by a substantially inverted U-shaped web so that a downwardly depending arm is formed, said arm having a first gripping member;

a downwardly depending portion being formed of said flanges on said first member and said web to have a plurality of slots adapted to receive a pivot pin;

said pivot pin being fitted to said downwardly depending portion whereby a pivoting connection is provided with said second clamp member;

said second member being formed as a substantially L-shaped member with a downwardly depending portion on which a second gripping member is formed;

said second member having a load supporting member projecting from said downwardly depending portion;

said downwardly depending portion being formed to receive a pivot pin;

said pivot pin being fitted to said downwardly depending portion whereby a pivoting connection is provided with said first clamp member;

whereby the fitting of said pin in said slot operates as a lost motion mechanism so that twisting moment applied between the load supporting member and the frame is substantially absorbed.

9. The clamp of claim 8 wherein a plurality of said clamps being used in a jacking device for servicing of rail car truck springs on car trucks having a side frame and a bolster comprising:

a pivoting load bar carried by said load supporting member of said clamp;

a lifting jack extending from said lifting bar;

a bolster plug adapted for connecting said jack to said bolster, whereby actuating said jack lifts said bolster, the mass of said car borne by said bolster being taken up by said jack and said car being lifted substantially vertically and said clamp being substantially torsionless with reference to said side frame.

10. A jack device for servicing of rail car truck springs on car trucks having a side frame with inner and outer surfaces and a bolster comprising:

clamp means for lifting from the side frame, having jaw means for bearing on one of said side frame surfaces and arm means for bearing on the other of said side frame surfaces, capturing said side frame between said jaw means and said arm means;

hook means for supporting load bar means extending from said jaw means;

pivoting load bar means for supporting jack means extending from said supporting member mean;

lifting jack means for lifting said car extending from said lifting bar means;

bolster plug means for connecting said jack means to said bolster, whereby actuating said jack means lifts said bolster, the mass of said car borne by said bolster being taken up by said jack means and said car being lifted substantially vertically and said clamp means being substantially torsionless with reference to said side frame;

said clamp means having a first clamp member and a second clamp member pivotally connected to said first clamp member;

said arm means being formed on a downwardly depending portion of said first clamp member;

said jaw means being formed on a downwardly depending portion of said second clamp member;

said hook means projecting outwardly from said second clamp member;

whereby a load borne by said supporting member means urges said jaw and said arm together through the action of said pivot.

11. The jack device according to claim 10 wherein said first clamp member being formed as a plurality of parallel substantially inverted U-shaped flanges joined by a substantially inverted U-shaped web so that a downwardly depending arm is formed;

a downwardly depending portion opposite said arm means being formed of said flanges and said web to have a plurality of slots adapted to receive a pivot pin;

a pivot pin being fitted to said downwardly depending portion whereby a pivoting connection is provided with said second clamp member.

12. The jack device according to claim 10 wherein said second clamp member being formed as a substantially L-shaped member with a downwardly depending portion on which said jaw is formed.

13. The jack device according to claim 10 wherein said first clamp member being formed as a plurality of parallel substantially inverted U-shaped flanges joined by a substantially inverted U-shaped web so that a downwardly depending arm is formed;

a downwardly depending portion opposite said arm means being formed of said flanges and said web to have a plurality of slots adapted to receive a pivot pin;

a pivot pin being fitted to said downwardly depending portion whereby a pivoting connection is provided with said second clamp member;

said second clamp member being formed as a substantially L-shaped member with a downwardly depending portion on which said jaw is formed;

said supporting member means projecting from said downwardly depending portion; said downwardly depending portion being formed to receive a pivot pin;

said pivot pin being fitted to said downwardly depending portion whereby a pivoting connection is provided with said first clamp member.

* * * * *